W. F. HYATT.
Bolts for Fastening Doors, &c.
No. 199,832. Patented Jan. 29. 1878.
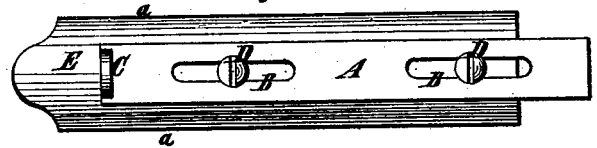
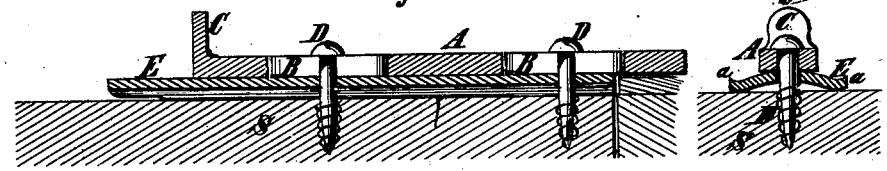

UNITED STATES PATENT OFFICE.

WILLIAM F. HYATT, OF BROOKLYN, NEW YORK.

IMPROVEMENT IN BOLTS FOR FASTENING DOORS, &c.

Specification forming part of Letters Patent No. 199,832, dated January 29, 1878; application filed June 19, 1877.

*To all whom it may concern:*

Be it known that I, WILLIAM F. HYATT, of Brooklyn, Kings county, and State of New York, have invented certain new and useful Improvements in Bolts, of which the following is a description:

The object of my invention is to produce a simple and cheap bolt for general use, and preferably one provided with means for securing it against movement, when this is desirable.

The invention consists in the combination, with a bolt provided with a longitudinal slot or slots passing through it, and a base-plate or sheath made separate therefrom, and provided with holes opposite the aforesaid slot or slots, of screws passing from the outer side of the bolt through the said slot or slots therein and holes of the base-plate or sheath, whereby, in a very simple and and inexpensive manner, the bolt is secured in place so that it is free to move longitudinally, and the base-plate or sheath is secured in place by the same means, so that, without any devices forming parts of it, it is absolutely precluded from movement.

It also consists in the combination, with a bolt and screws for securing it to its support, of a spring-plate interposed between it and its support, whereby, without entailing injury to the support, the bolt may be so tightly clamped in place by the screws as to prevent it from being adjusted, all as hereinafter more fully described and claimed.

In the accompanying drawings, Figure 1 is a face view of a bolt, base-plate, and means for securing them in place, embodying my improvements. Fig. 2 is a longitudinal section of the bolt and its base-plate, and Fig. 3 a transverse section thereof.

Similar letters of reference designate corresponding parts in all the figures.

A designates a bolt of rectangular form, shown as provided with longitudinal slots B, and at the rear end with a push-piece, C.

D designates means for securing the bolt in place, consisting, in this example of my invention, of screws whose shanks or bodies pass through the slots B and into the support S of the bolt, and whose heads lap over the edges of the said slots B and retain the bolt in place.

E designates a base-plate, forming a bearing for the bolt, insuring its working properly, and precluding it from embedding itself into and injuring its support, as it would, in the absence of such a plate, be liable to do when applied to a wooden support. This base-plate may, with advantage, be secured in place by the same means which secure the bolt in position.

In Figs. 2 and 3 I have shown that the screws D, after passing through the slots in the bolt, extend through holes in the plate E before entering the support S, and thus secure the said plate in place.

Preferably the base-plate is made bow-shaped transversely, so that it will serve as a spring; for then, if the bolt is forced upon it, by inserting the screws farther into the support, the bolt may be so securely held in position as to preclude all possibility of moving it with a knife or other instrument inserted between the two parts which it secures together. This plate, through its elasticity, bears upon the bolt throughout its length, and exerts more friction on it than could be obtained from binding the bolt on an ordinary flat support. The convex form of the base-plate is also advantageous in another way. It prevents the bolt, when tightly clamped, embedding its edges into the plate, so as to cut into it, wear it away, and mar its appearance.

I have shown (see Fig. 3) the side edges *a* of the base-plate as turned upward, so that when the screws are manipulated to clamp the bolt in position, as previously described, they will not indent the said edges of the plate into its support, so that the said plate will be precluded from spreading and possessing the proper elasticity.

The operation of the bolt, save as regards its clamping, is like that of an ordinary bolt, as may be seen from Fig. 2, wherein it is shown as secured to one of two separable parts—for instance, the meeting-rails of two window-sashes—and lapping over the other part.

It will have been seen that by my invention I produce a bolt adapted for general use, of very cheap construction, owing to the absence on the base-plate of any means for securing the bolt thereto, adapted to be very easily secured in place, because the very same devices which serve to secure the bolt to its support serve to secure the bolt to its base-plate, and afford provision for clamping it in position. The same principle might be embodied in locks with advantage.

What I claim as my invention, and desire to secure by Letters Patent, is—

1. The combination, with a bolt provided with a longitudinal slot or slots passing entirely through it, and a base-plate or sheath made separate therefrom, and provided with holes opposite the aforesaid slots, of screws passing through the slot or slots of the bolt from the outer side, and passing through and fitting snugly in the holes of the base-plate or sheath, substantially as described, whereby the bolt is secured to the base-plate or sheath, and the latter is secured to its support by the same means, which of themselves afford provision for the movement of the bolt and preclude the movement of the base-plate or sheath.

2. The combination, with a bolt, A, and screws for securing it to its support, of a base-plate, E, for the bolt, constructed to form a spring, substantially as and for the purpose set forth.

W. F. HYATT.

Witnesses:
 A. J. DeLacy,
 Chandler Hall.